(12) United States Patent
Okamoto

(10) Patent No.: US 12,400,481 B2
(45) Date of Patent: Aug. 26, 2025

(54) LINE-OF-SIGHT DETECTION APPARATUS AND IMAGE CAPTURING APPARATUS

(71) Applicant: CANON KABUSHIKI KAISHA, Tokyo (JP)

(72) Inventor: Kohei Okamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 17/947,241

(22) Filed: Sep. 19, 2022

(65) Prior Publication Data

US 2023/0094627 A1    Mar. 30, 2023

(30) Foreign Application Priority Data

Sep. 27, 2021    (JP) .................................. 2021-157238

(51) Int. Cl.
*G06V 40/18*    (2022.01)
*G06F 3/01*    (2006.01)
*G06V 40/19*    (2022.01)

(52) U.S. Cl.
CPC ............ *G06V 40/193* (2022.01); *G06F 3/013* (2013.01); *G06V 40/19* (2022.01)

(58) Field of Classification Search
CPC ....................................................... G06F 3/013
See application file for complete search history.

(56) References Cited

U.S. PATENT DOCUMENTS 11,237,628 B1 *   2/2022  Sharma ............. G02B 27/1086
2011/0019874 A1   1/2011  Jaervenpaeae
2012/0133754 A1 * 5/2012  Lee ..................... H04N 21/4223
                                                                348/78
2019/0253700 A1 * 8/2019  Tornéus ............. G02B 27/0093
2020/0012105 A1 * 1/2020  Liu ......................... H04N 23/20
(Continued)

FOREIGN PATENT DOCUMENTS

JP    H02004313 A    1/1990
JP    2002119478 A   4/2002
JP    2010017407 A   1/2010
(Continued)

OTHER PUBLICATIONS

The above Foreign Patent Documents were cited in a Japanese Office Action that issued on Jun. 6, 2025, which is enclosed, with an English translation, that issued in the corresponding Japanese Patent Application No. 2021-157238.

*Primary Examiner* — Edward Park
(74) *Attorney, Agent, or Firm* — Cowan, Liebowitz & Latman, P.C.

(57) ABSTRACT

A line-of-sight detection apparatus includes an acquisition unit configured to acquire an eyeball image, an irradiation unit configured to irradiate an eyeball with light in an infrared wavelength band, forming a plurality of point-shaped optical images on the eyeball image, and a calculation unit configured to calculate line-of-sight information based on the eyeball image and the plurality of point-shaped optical images, wherein the irradiation unit includes at least one single light source configured to emit the light in the infrared wavelength band, and a dividing element configured to divide the light emitted from the single light source into a plurality of beams of the emitted light to form the plurality of point-shaped optical images.

7 Claims, 9 Drawing Sheets

(56) References Cited

U.S. PATENT DOCUMENTS

2020/0092534 A1\* 3/2020 Eckhouse ............. G06T 7/0012
2020/0305712 A1\* 10/2020 Kojima ................. A61B 3/113

FOREIGN PATENT DOCUMENTS

| JP | 2019-139743 A | 8/2019 |
| JP | 2020036741 A | 3/2020 |
| JP | 2020204914 A | 12/2020 |
| WO | 2023021724 A | 2/2023 |

\* cited by examiner

LINE-OF-SIGHT DETECTION APPARATUS AND IMAGE CAPTURING APPARATUS

BACKGROUND OF THE INVENTION

Field of the Invention

The present invention relates to a line-of-sight detection apparatus that can detect a line of sight.

Description of the Related Art

Line-of-sight detection techniques have been studied and practical advancements have been made in fields such as detection of the line-of-sight of a driver of an automobile or the like, study on human line-of-sight behavior, and techniques for supporting handicapped persons. A corneal reflection method is one of a plurality of methods proposed for line-of-sight detection, and is advantageous in terms of accuracy and downsizing. The corneal reflection method is a method of calculating line-of-sight information from a near infrared eyeball image, and is based on the arrangement of a Purkinje image in the eyeball image.

To acquire the line-of-sight information using the corneal reflection method, a plurality of Purkinje images need to be formed in the eyeball image. For example, in Japanese Patent Laid-Open No. 2019-139743, this is realized by arranging a plurality of infrared light sources on eyeglasses.

Still, while there is demand for an apparatus that is smaller and more accuracy for line of sight detection for the line-of-sight detection technique, it is difficult to achieve such smaller and more accurate apparatus with known techniques, since a large number of light sources are required and a degree of freedom in the arrangement of the light sources is low.

SUMMARY OF THE INVENTION

The present invention has been made in view of the problem described above, and provides a line-of-sight detection apparatus that has a small size and can detect the line of sight with high accuracy.

According to a first aspect of the present invention, there is provided a line-of-sight detection apparatus comprising: at least one processor or circuit configured to function as: an acquisition unit configured to acquire an eyeball image; an irradiation unit configured to irradiate an eyeball with light in an infrared wavelength band, forming a plurality of point-shaped optical images on the eyeball image; and a calculation unit configured to calculate line-of-sight information based on the eyeball image and the plurality of point-shaped optical images, wherein the irradiation unit includes at least one single light source configured to emit the light in the infrared wavelength band, and a dividing element configured to divide the light emitted from the single light source into a plurality of beams of the emitted light to form the plurality of point-shaped optical images.

According to a second aspect of the present invention, there is provided an image capturing apparatus comprising: an image capturing device configured to capture an image of a subject; a display apparatus configured to be able to display the image captured by the image capturing device; and the line-of-sight detection apparatus described above.

According to a third aspect of the present invention, there is provided a line-of-sight detection apparatus comprising: at least one processor or circuit configured to function as: an acquisition unit configured to acquire an eyeball image; an irradiation unit configured to irradiate an eyeball with light in an infrared wavelength band, forming a plurality of point-shaped optical images on the eyeball image; and a calculation unit configured to calculate line-of-sight information based on the eyeball image and the plurality of point-shaped optical images, wherein the irradiation unit has a micro light source array including micro light sources being arranged in a two-dimensional array.

According to a fourth aspect of the present invention, there is provided an image capturing apparatus comprising: an image capturing device configured to capture an image of a subject; a display apparatus configured to be able to display the image captured by the image capturing device; and the line-of-sight detection apparatus described above.

Further features of the present invention will become apparent from the following description of exemplary embodiments with reference to the attached drawings.

DESCRIPTION OF THE EMBODIMENTS

Figure 1A:
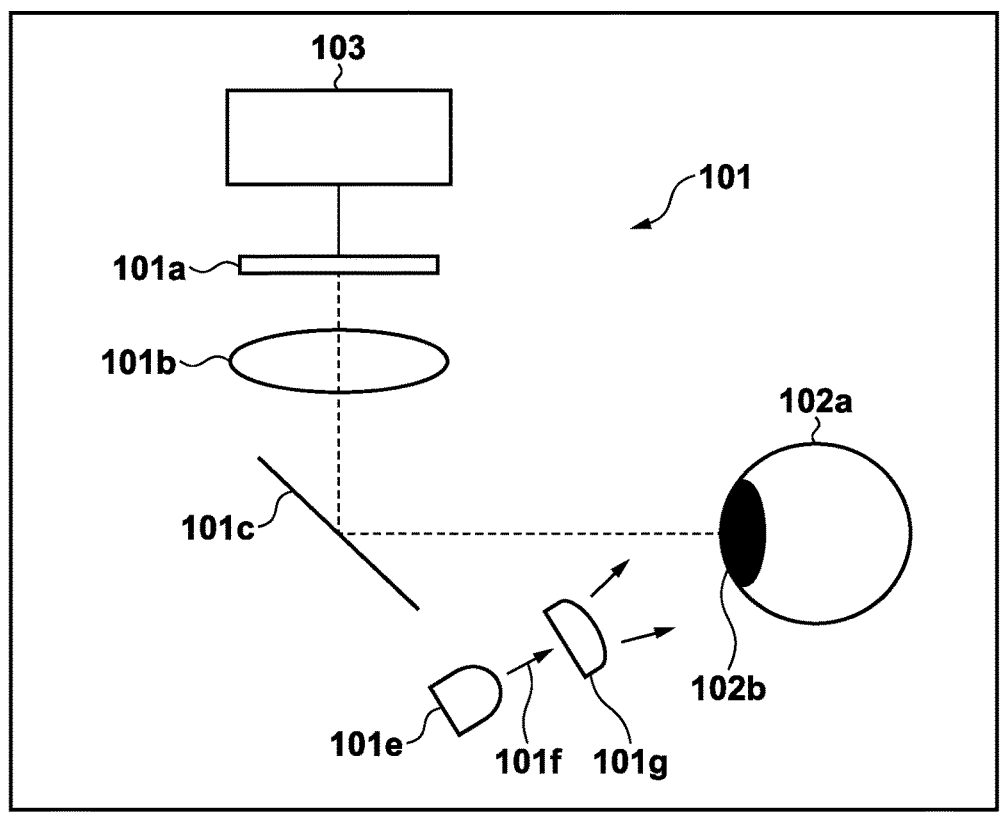
FIG. 1A is a schematic diagram illustrating a configuration of a line-of-sight detection apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A first embodiment of the present invention will be described below.

Line-of-Sight Detection Apparatus

FIG. 1 is a diagram illustrating a configuration of a first embodiment of a line-of-sight detection apparatus of the present invention. In the present embodiment, a configuration is employed in which the line-of-sight position of an eyeball 102a is identified by using a corneal reflection method.

The eyeball 102a includes, in the white portion of the eye, an iris portion 102b including the pupil. A line-of-sight detection apparatus 101 of the present embodiment includes a single light source 101e configured to irradiate an eyeball surface (a surface portion including the cornea) with light 101f in a near infrared wavelength band. The light 101f emitted from the single light source 101e is divided into light in two directions by an irradiation light dividing element 101g, and emitted onto the surface of the eyeball 102a.

The irradiation light dividing element 101g is not limited to a particular element, and any element that divides light may be used such as a diffractive optical element (DOe) using optical interference, or a micro scanner element.

In the configuration illustrated in FIG. 1A, the light emitted to the eyeball surface is partially reflected by the eyeball surface, and then is further reflected by a reflection mirror 101c, to reach an image sensor 101a, serving as an eyeball image acquisition unit, through an imaging lens 101b. A point irradiation unit of the present embodiment includes the single light source 101e and the irradiation light dividing element 101g.

Line-of-sight information includes a direction/angle of a viewing axis, a position, on a screen region facing the eyeball, where the line-of-sight crosses the screen, and the like. The line-of-sight information is acquired from a line-of-sight information calculation unit 103, based on the eyeball image acquired by the image sensor 101a.

In the present embodiment, the reflection mirror 101c is a dichroic mirror that reflects near infrared light and transmits visible light, so that the situation in which a subject can see the scenery through the mirror is realized. Still, the present embodiment is not necessarily limited to a configuration involving wavelength selection using the dichroic mirror. The configuration illustrated in FIG. 1A should not be construed in a limiting sense, and a configuration illustrated in FIG. 1B may be employed for example, in which near infrared reflected light from the eyeball is made incident on the image sensor 101a through a bandpass filter 101h through which only the infrared light passes.

With this configuration, the line-of-sight information calculation unit 103 can obtain the near infrared eyeball image.

Figure 1B:
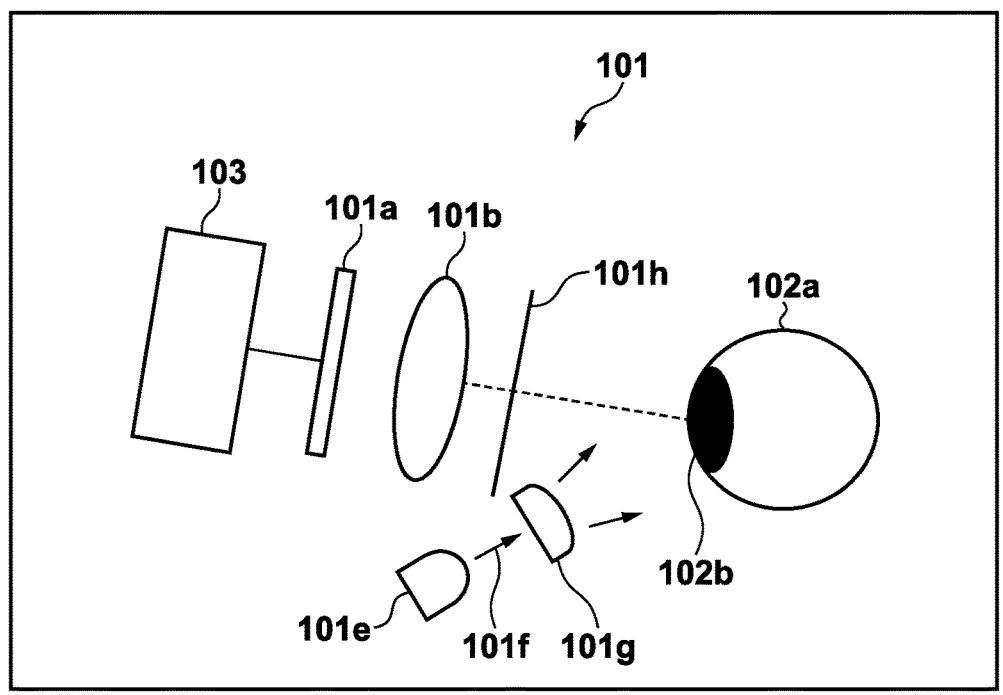
FIG. 1B is a schematic diagram illustrating a configuration of a line-of-sight detection apparatus according to a modification example of the first embodiment.
Figure 2:
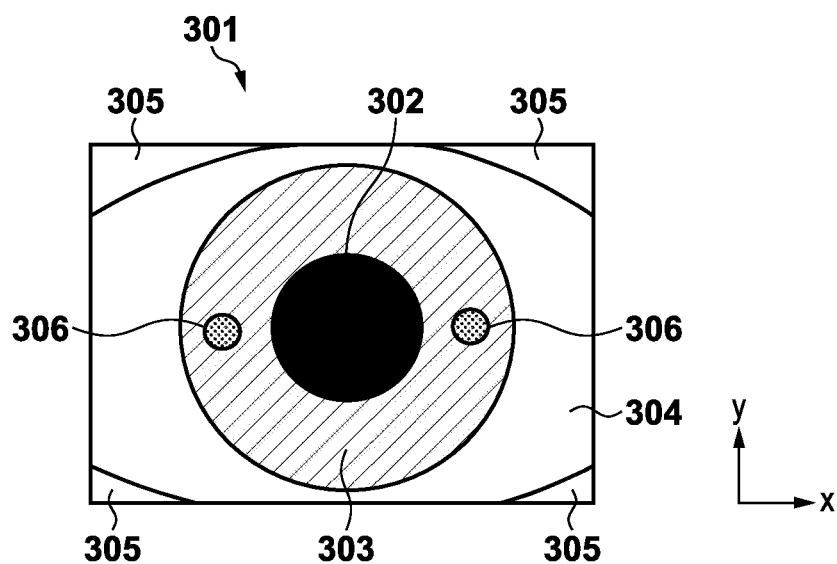
FIG. 2 is a schematic diagram illustrating an example of an eyeball image.

An eyeball image 301 illustrated in FIG. 2 is an example of the eyeball image obtained with the configuration illustrated in FIG. 1A or FIG. 1B. In the eyeball image 301, an eyelid portion 305, a white eye portion 304 of the eyeball therein, and an iris portion 303 therein, and a pupil 302, which is an opening portion, near the center of the iris portion 303 are captured. The present example is a typical example of an eyeball image obtained by the corneal reflection method.

The light divided in two by the irradiation light dividing element 101g forms Purkinje images 306 that are two point-shaped optical images, on the eyeball image 301. Here, a pair of Purkinje images 306 are formed in a direction substantially parallel to an x direction in FIG. 2, and are adjusted to sandwich the center of the eyeball image or the pupil region. This allows the line-of-sight information in the x direction to be calculated using the positions of the Purkinje images 306 on the eyeball image, as well as the contour shape and the position of the pupil 302.

Figure 3:
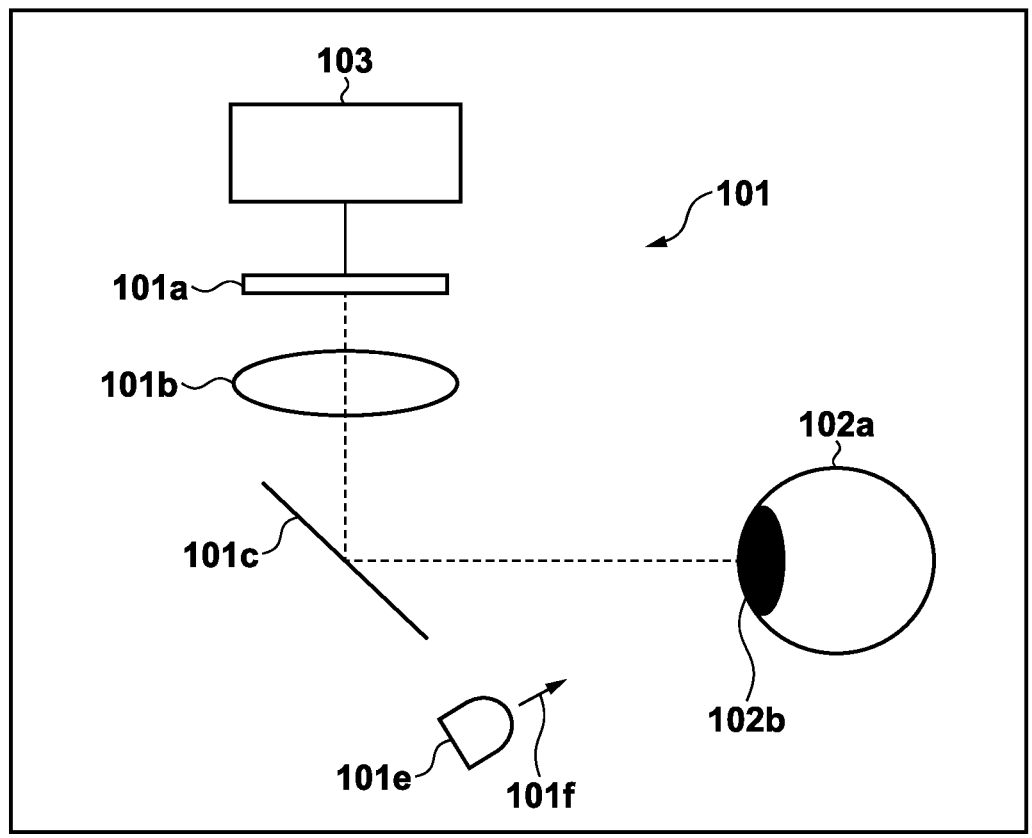
FIG. 3 is a diagram illustrating an example of a known line-of-sight detection apparatus.

In the present embodiment, by providing the irradiation light dividing element 101g, unit downsizing can be achieved. With the known configuration illustrated in FIG. 3, the unit downsizing is difficult to achieve because a light source corresponding to each Purkinje image is required for forming the plurality of Purkinje images, due to the absence of the irradiation light dividing element.

Figure 4:
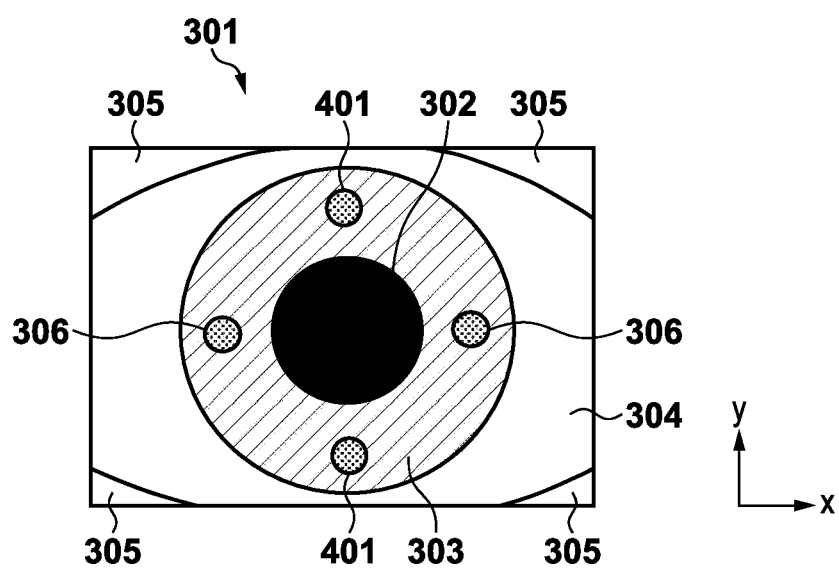
FIG. 4 is a schematic diagram illustrating an example of an eyeball image according to the first embodiment.

Through the irradiation of light to form, on the eyeball image, pairs of Purkinje images two-dimensionally arranged at least respectively in the horizontal direction and the vertical direction on the pupil 302 as the center as illustrated in FIG. 4, the line-of-sight information in at least the x direction and a y direction can be detected. Thus, the two-dimensional line-of-sight information can be detected.

In FIG. 4, the pair of Purkinje images 306 are used for the line-of-sight information in the x direction, and a pair of Purkinje images 401 are used for the line-of-sight information in the y direction. Note that the pair of Purkinje images 401 are also formed to be opposite to each other with the pupil 302 at the center of the eyeball image interposed in between.

Figure 5A:
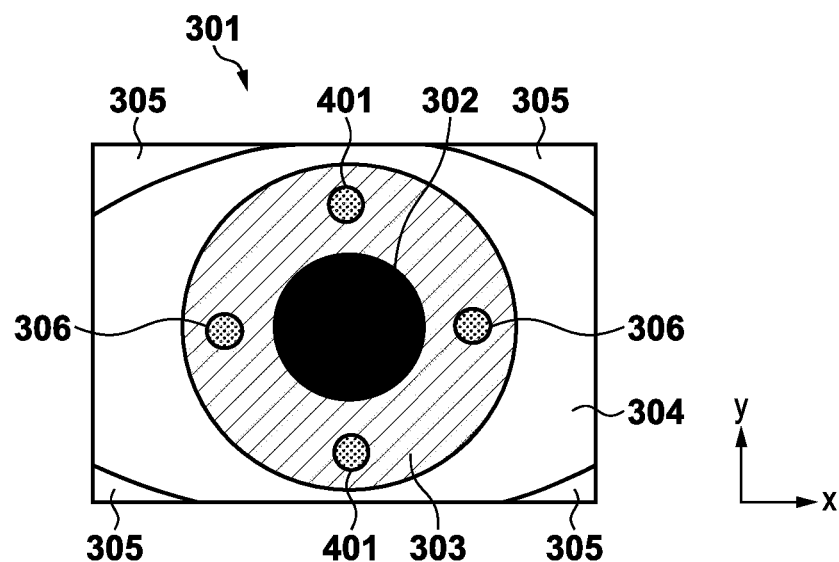
FIG. 5A is a schematic diagram illustrating an eyeball image for describing individual differences in a human eye.
Figure 5B:
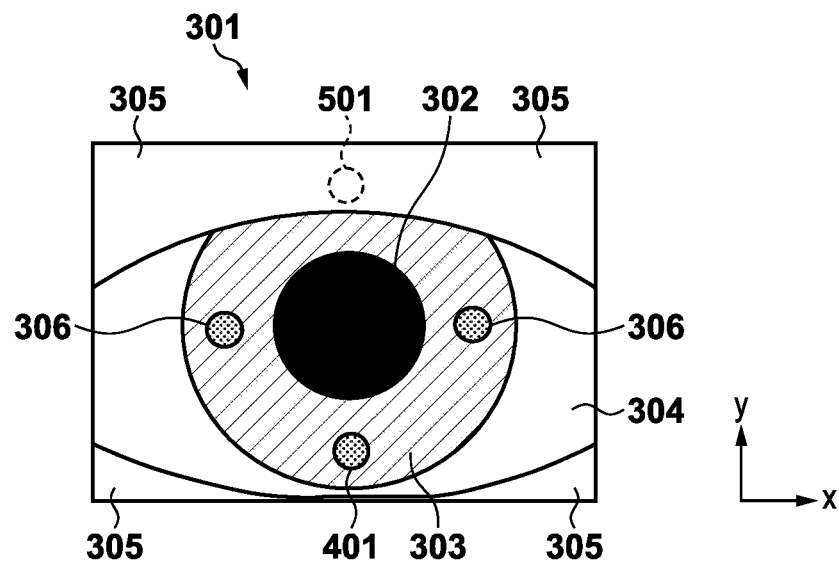
FIG. 5B is a schematic diagram illustrating an eyeball image for describing individual differences in a human eye.

It has been known that the detection accuracy of the line-of-sight detection is largely affected by individual differences in eyes between subjects, that is, persons. In particular, covering amount of the eyeball by the eyelid differs among people, and thus the covering amount largely impacts the accuracy of the line-of-sight detection. FIG. 5A illustrates an example of an eyeball image of a person whose eyelids are ideally opened. FIG. 5B illustrates an example of an eyeball image of a person whose eyeball is relatively largely covered by his or her eyelid.

It is relatively common for an eyeball of a person to be covered with the upper eyelid, but it is rare for the eyeball to be largely covered with the lower eyelid. In FIG. 5A, the captured image clearly includes four of the Purkinje images as intended. On the other hand, a Purkinje image 501 (one of the Purkinje images) that is supposed to be on the +y side is hidden by the upper eyelid in FIG. 5B.

Still, even in the case of FIG. 5B, according to the arrangement of four of the Purkinje images of the present embodiment, the Purkinje image on the −y side is present and only the Purkinje image on the +y side is hidden. Thus, the captured image includes the pair of Purkinje images 306 and one Purkinje image 401, and three of the Purkinje images are two-dimensionally arranged, whereby the line-of-sight information in the x direction and the y direction can be acquired.

Figure 6:
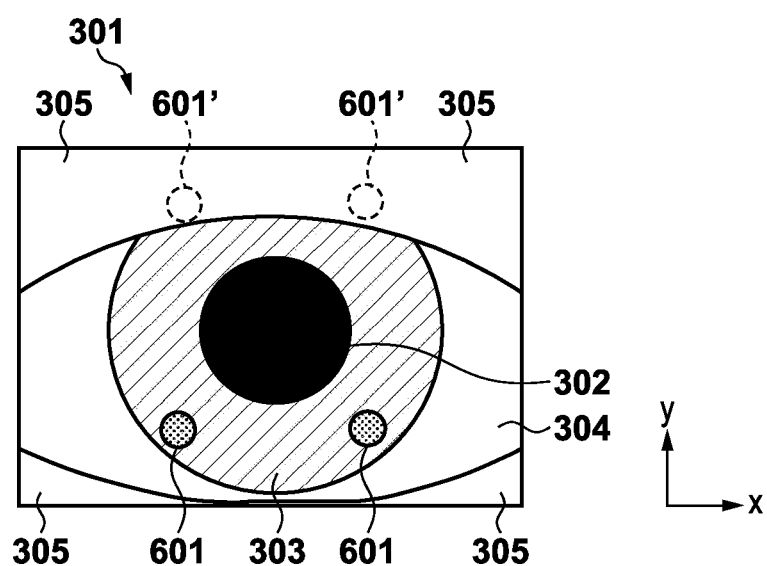
FIG. 6 is a schematic diagram illustrating Purkinje images with which individual differences in a human eye are difficult to reduce.

FIG. 6 illustrates a case where Purkinje images paired in the x direction and the y direction are formed, but in each direction, the Purkinje images are not formed opposite to each other with the pupil 302 at the center of the eyeball image 301 interposed in between. The two-dimensional line-of-sight information cannot be obtained in the case illustrated in FIG. 6, because of four target Purkinje images 601 and 601', the Purkinje images 601' on the +y side are hidden.

As described above, with the line-of-sight detection apparatus of the present embodiment, two pairs of Purkinje images in the x direction and the y direction are each formed to be opposite to each other with the pupil 302 interposed in between, so that the line-of-sight detection can be performed with high accuracy even when vignetting is occurring on the eyeball image due to an eyelid.

Figure 7A:
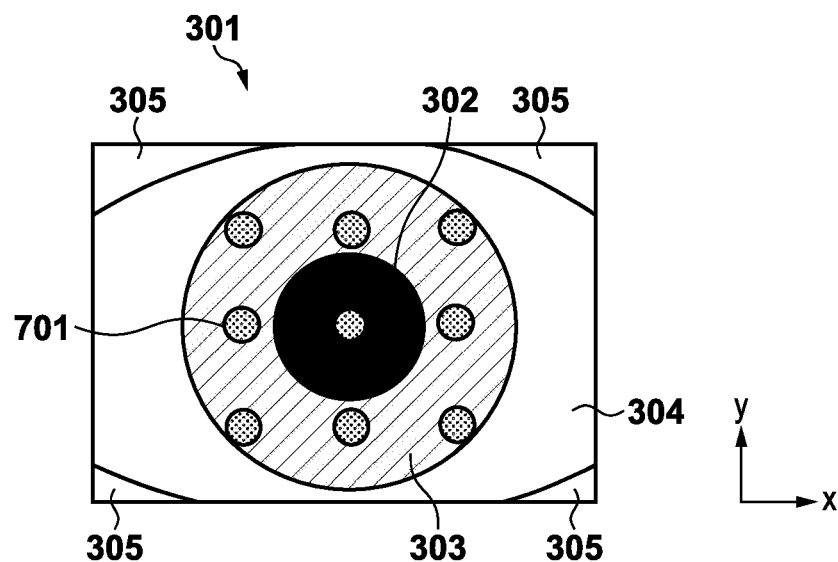
FIG. 7A is a schematic diagram illustrating Purkinje images in a two-dimensional array form on an eyeball image.
Figure 7B:
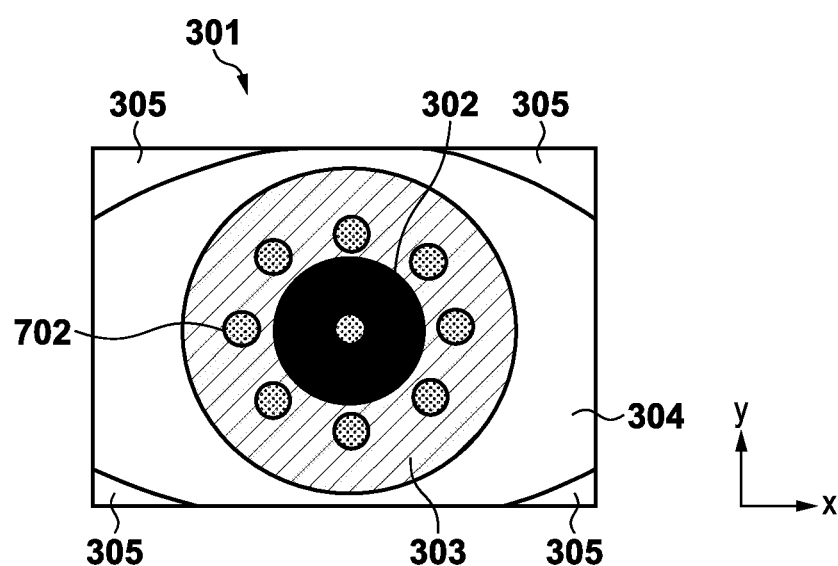
FIG. 7B is a schematic diagram illustrating Purkinje images in a two-dimensional array form on an eyeball image.

With the line-of-sight detection apparatus of the present embodiment, Purkinje images are formed in a two-dimensional array form on the eyeball image as illustrated in FIG. 7A and FIG. 7B, so that the line-of-sight information can be acquired with higher accuracy. Examples of the arrangement in the two-dimensional array form include, but are not limited to, a lattice form illustrated in FIG. 7A, a concentric form as illustrated in FIG. 7B where Purkinje images are each disposed on a corresponding one of straight lines passing through the center, and the like.

When a plurality of groups of Purkinje images are formed using a plurality of respective single light sources, the impact of stray light and scattered light can be suppressed by varying the time of formation among the Purkinje image groups.

Second Embodiment

Line-of-Sight Detection Apparatus

A line-of-sight detection apparatus of a second embodiment is configured with the point irradiation unit in the line-of-sight detection apparatus 101 of the first embodiment replaced with a two-dimensional micro light source array. A micro light source forming the two-dimensional micro light source array may be a light emitting diode, or a Vertical cavity Surface emitting Laser Diode (VcSeL). Light sources two-dimensionally arranged in-plane parallel to a substrate can be used as the two-dimensional micro light source array. Furthermore, a laser bar stack that is a stack of one-dimensionally arranged edge emitting type laser elements on the substrate can be use as the two-dimensional micro light source array. With such a two-dimensional micro light source array used as the point irradiation unit, an array of point-shaped optical images can be formed on an eyeball image efficiently with a compact configuration.

Third Embodiment

Electronic Apparatus

Figure 8:
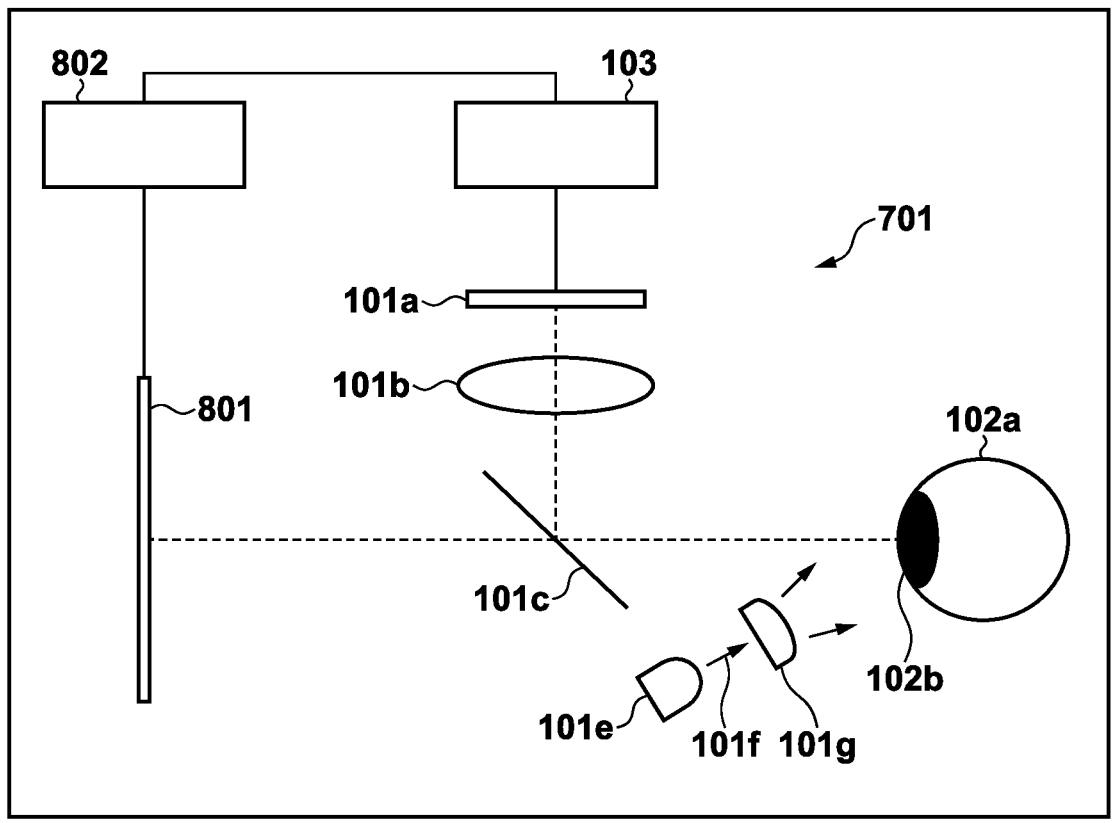
FIG. 8 is a schematic diagram illustrating a configuration of a line-of-sight detection apparatus according to a third embodiment.

FIG. 8 is a schematic diagram illustrating a configuration of a line-of-sight detection apparatus 701 according to a third embodiment. The third embodiment relates to a configuration obtained by providing the line-of-sight detection apparatus of the first embodiment with a display apparatus that can display an image.

In FIG. 8, the line-of-sight detection apparatus 701 includes a display 801 serving as the display apparatus, and a controller 802 that controls what is displayed on the display. In a state where a video or the like is being displayed on the display 801, an observer can observe the video on the display 801 through the dichroic mirror 101c.

In the present embodiment, the line-of-sight information calculation unit 103 calculates the line-of-sight direction of the observer from the eyeball image acquired by the image sensor 101a. With the information on this line-of-sight direction transmitted to the display controller 802, the line-of-sight position can be displayed on the display in a superimposing manner in real time. With the configuration illustrated in FIG. 8, a television monitor, a monitor for a personal computer, or the like may be used as the display 801.

Fourth Embodiment

Electronic Apparatus

Figure 9:
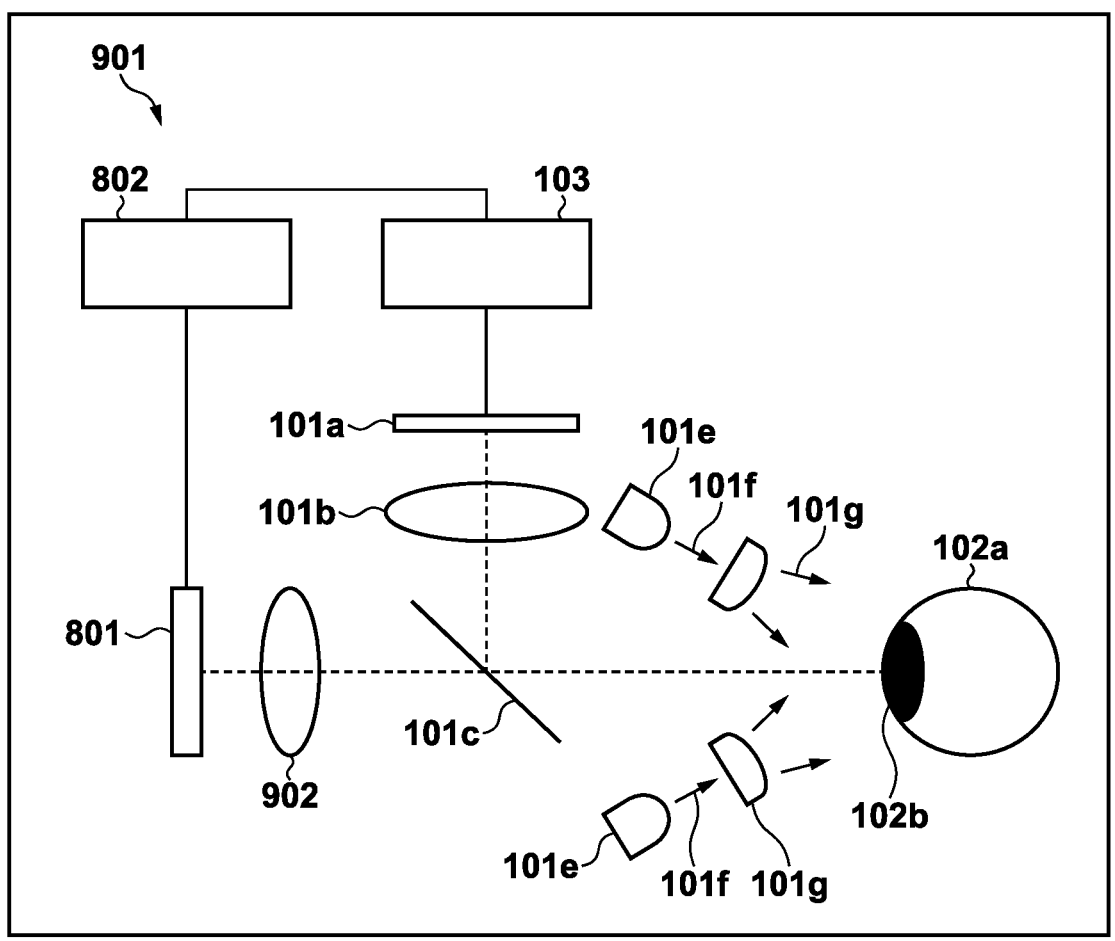
FIG. 9 is a schematic diagram illustrating a configuration of a line-of-sight detection apparatus according to a fourth embodiment.

FIG. 9 is a schematic diagram illustrating a configuration of a line-of-sight detection apparatus 901 according to a fourth embodiment. A configuration of the fourth embodiment is obtained with the line-of-sight detection apparatus 701 of the third embodiment provided with an eyepiece lens 902, with which the video on the display apparatus 801 is optimized and delivered to the eyeball.

When the line-of-sight detection apparatus is incorporated in an apparatus formed as a small unit such as a camera electronic viewfinder, a display apparatus for the line-of-sight detection apparatus is small. Thus, in the present embodiment, the eyepiece lens 902 is disposed in front of the display apparatus 801, so that the observer can comfortably view the video on the small display apparatus 801.

In the configuration of the present embodiment, two single light sources 101e and two irradiation light dividing elements 101g are provided, to form the Purkinje images 306 and 401 on the eyeball image using emitted light from the respective single light sources as illustrated in FIG. 4.

Fifth Embodiment

Image Capturing Apparatus

Figure 10:
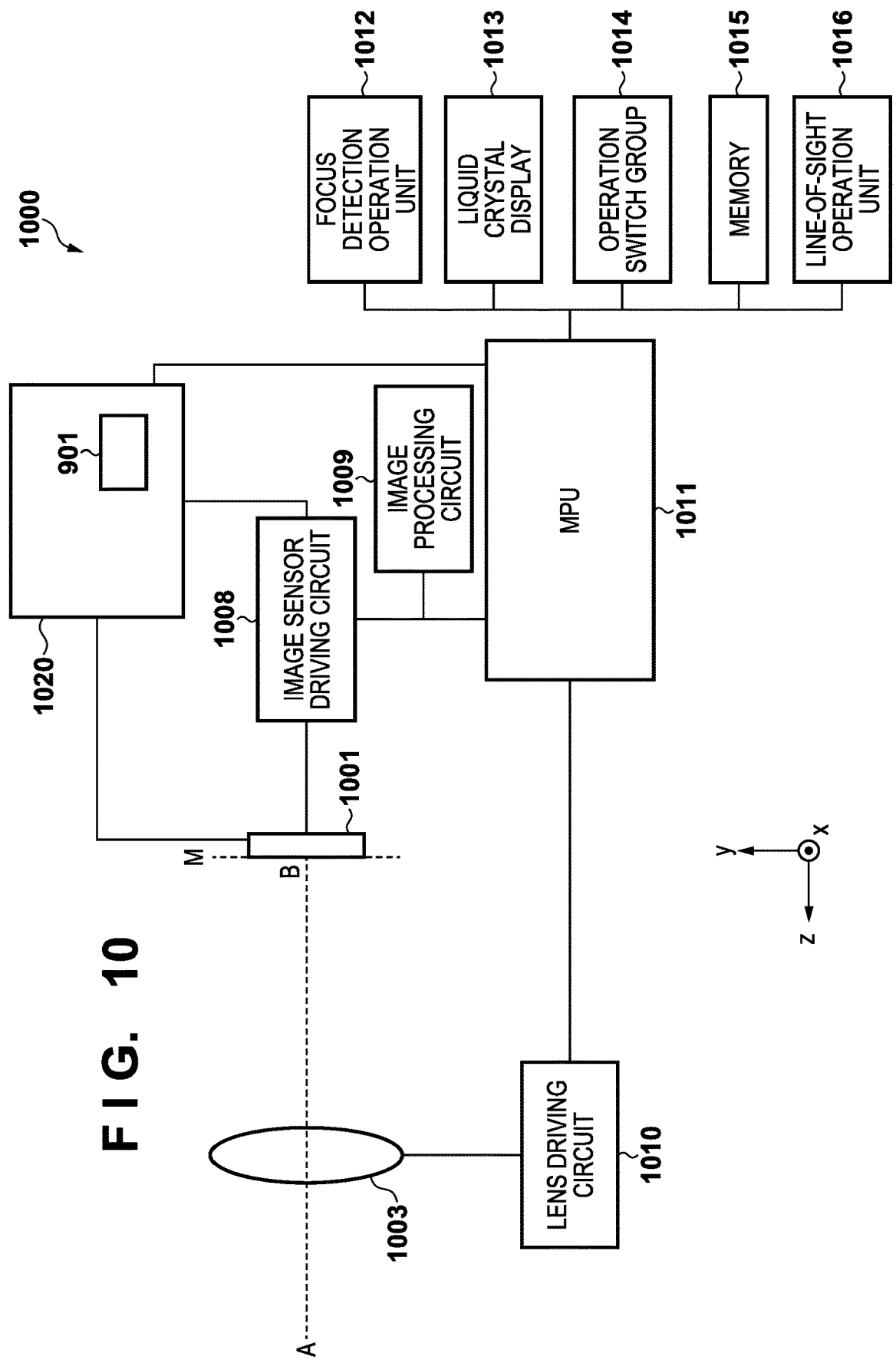
FIG. 10 is a schematic diagram illustrating a configuration of an image capturing apparatus according to a fifth embodiment.

FIG. 10 is a diagram illustrating a configuration of an image capturing apparatus 1000 including an electronic viewfinder 1020, according to a fifth embodiment. The line-of-sight detection apparatus 901 is incorporated in the electronic viewfinder 1020.

In FIG. 10, the image capturing apparatus 1000 includes an image sensor 1001 configured to capture an image, an MPU 1011 configured to perform processing on various signals, data, and the like for the image capturing apparatus, a liquid crystal display 1013 in charge of input/output to and from the external, an operation switch group 1014, and a memory 1015. An image sensor driving circuit 1008 configured to drive the image sensor 1001, and an image processing circuit 1009 configured to perform processing of an image signal from the image sensor 1001 are further provided.

When a focus detection operation is instructed through a focus detection operation unit 1012 including a button and the like used for an operation for the focus detection, the focus detection is performed based on a captured image signal from the image sensor 1001. The image sensor 1001 is an element configured to acquire an image, which is different from an image sensor configured to capture the eyeball image provided in the line-of-sight detection apparatus 901 in the electronic viewfinder 1020.

In the present embodiment, focus detection and focus adjustment are performed using on-imaging surface phase difference method. The focus adjustment is performed by performing focus detection, calculating the driving amount for a focus lens in an imaging optical system 1003 required for focusing, and moving the focus lens to a focusing position.

Image data acquired by the image sensor 1001 through the imaging optical system 1003 is processed by the image processing circuit 1009 as to-be-stored image data, and then is stored in the memory 1015, such as an SD card, detachably attached to the image capturing apparatus 1000. Live view data for a state where a shooting button is not pressed is processed to be displayed on the electronic viewfinder 1020 or the liquid crystal display 1013, and then is displayed on the display. A user viewing the electronic viewfinder 1020 can observe his or her line-of-sight position pointer displayed in a superimposing manner with the video.

With the user's line-of-sight position pointer displayed in real time on the display of the electronic viewfinder 1020, a region to be focused can be select by the line of sight. The image capturing apparatus 1000 of the present embodiment is provided with a line-of-sight operation unit 1016 with which a region selection operation by the line of sight can be performed to determine the focus detection region of the camera. The image capturing apparatus 1000 performs focus detection on the region thus determined.

As described in the first to the fourth embodiments, the line-of-sight detection apparatus 901 used for the image capturing apparatus 1000 of the present embodiment can have a small size and perform line-of-sight detection with high accuracy that is less likely to be affected by the individual differences among people. Thus, the accuracy and speed of a series of operations performed by the image capturing apparatus 1000 of the present embodiment such as autofocusing and subject selection can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157238, filed Sep. 27, 2021 which is hereby incorporated by reference herein in its entirety.

What is claimed is:

1. A line-of-sight detection apparatus comprising:
   at least one processor or circuit configured to function as:
   an acquisition unit configured to acquire an eyeball image;
   an irradiation unit configured to irradiate an eyeball with light in an infrared wavelength band, forming a plurality of point-shaped optical images on the eyeball image; and
   a calculation unit configured to calculate line-of-sight information based on the eyeball image and the plurality of point-shaped optical images, wherein
   the irradiation unit includes at least one single light source configured to emit the light in the infrared wavelength band, and a dividing element configured to divide the light emitted from the single light source into a plurality of beams of the emitted light to form the plurality of point-shaped optical images,
   wherein the irradiation unit forms pairs of the point-shaped optical images, at least in a horizontal direction and a vertical direction, on the eyeball image, the point-shaped optical images in each of the pairs being opposite to each other with the center of the eyeball image interposed in between.

2. The line-of-sight detection apparatus according to claim 1, wherein the irradiation unit forms the plurality of point-shaped optical images two-dimensionally arranged on the eyeball image.

3. The line-of-sight detection apparatus according to claim 1, wherein the irradiation unit forms the plurality of point-shaped optical images, in such a manner that even when part of the plurality of point-shaped optical images is hidden by an eyelid, remaining ones of the plurality of point-shaped optical images are two-dimensionally arranged.

4. The line-of-sight detection apparatus according to claim 1, wherein the irradiation unit forms the optical images on a straight line passing through the center of the eyeball image.

5. An image capturing apparatus comprising:
   an image capturing device configured to capture an image of a subject;
   a display apparatus configured to be able to display the image captured by the image capturing device; and
   the line-of-sight detection apparatus according to claim 1.

6. The image capturing apparatus according to claim 5, wherein the display apparatus is further able to display the line-of-sight information.

7. The image capturing apparatus according to claim 5, wherein an image on the display apparatus is observable by a user through the line-of-sight detection apparatus.

* * * * *